United States Patent
Billy et al.

(10) Patent No.: US 12,078,711 B2
(45) Date of Patent: Sep. 3, 2024

(54) METHOD FOR DETECTING THE OPENING OF THE OPENABLE SECTIONS OF A MOTOR VEHICLE AND ASSOCIATED DETECTION DEVICE

(71) Applicant: Continental Automotive Technologies GmbH, Hannover (DE)

(72) Inventors: Stéphane Billy, Toulouse (FR); Sylvain Godet, Toulouse (FR); Rachid Benbouhout, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/569,064

(22) PCT Filed: Jun. 24, 2022

(86) PCT No.: PCT/EP2022/067417
§ 371 (c)(1),
(2) Date: Dec. 11, 2023

(87) PCT Pub. No.: WO2022/269071
PCT Pub. Date: Dec. 29, 2022

(65) Prior Publication Data
US 2024/0142595 A1    May 2, 2024

(30) Foreign Application Priority Data
Jun. 25, 2021   (FR) ..................... 2106853

(51) Int. Cl.
*G01S 13/08* (2006.01)
*G01S 7/40* (2006.01)

(52) U.S. Cl.
CPC ............... *G01S 13/08* (2013.01); *G01S 7/40* (2013.01)

(58) Field of Classification Search
CPC ...... G01S 13/765; G01S 13/931; G01S 13/08; G01S 13/88; G01S 15/08; G01S 15/931; G01S 17/931; G01S 17/08; G01S 11/02
(Continued)

(56) References Cited

U.S. PATENT DOCUMENTS

| 5,307,048 A | 4/1994 | Sonders |
| 6,856,281 B2 * | 2/2005 | Billington ............. G01S 13/583 342/174 |

(Continued)

FOREIGN PATENT DOCUMENTS

| DE | 102015208621 B4 | 9/2018 |
| KR | 100610342 B1 | 8/2006 |
| KR | 20170092778 A | 8/2017 |

OTHER PUBLICATIONS

International Search Report and Written Opinion for International Application No. PCT/EP2022/067417, mailed Nov. 9, 2022, 16 pages.

(Continued)

*Primary Examiner* — Vladimir Magloire
*Assistant Examiner* — Michael W Justice
(74) *Attorney, Agent, or Firm* — Buchanan Ingersoll & Rooney PC

(57) ABSTRACT

A method for detecting the opening of the openable sections of a motor vehicle by a detection device. The device includes at least two ultra-high-frequency communication modules, each located on a different openable section and connected to an electronic computer. An opening angle of a first openable section is determined based on: a first distance between a rotation point of the first openable section on which a first communication module is located and a position of a second module when the two openable sections associated with the two modules are closed; a second distance between a rotation point of the first openable (Continued)

section and a position of the first module on the openable section; a distance between the two modules when the two openable sections associated with the two modules are closed; a distance between the modules, determined by a time of flight of ultra-high-frequency radiation exchanged between the modules.

5 Claims, 2 Drawing Sheets

(58) Field of Classification Search
USPC .................................................... 342/118, 70
See application file for complete search history.

(56) References Cited

U.S. PATENT DOCUMENTS

| | | | |
|---|---|---|---|
| 8,280,593 B2* | 10/2012 | Nakakura | E05F 15/43 |
| | | | 701/49 |
| 8,454,081 B2 | 6/2013 | Kim | |
| 9,777,528 B2* | 10/2017 | Elie | E05F 15/41 |
| 10,168,415 B2* | 1/2019 | Kanaga | G01S 5/0284 |
| 10,329,823 B2 | 6/2019 | Khan et al. | |
| 10,392,837 B2 | 8/2019 | Oomi | |
| 10,443,287 B2* | 10/2019 | Elie | E05F 15/42 |
| 10,486,646 B2 | 11/2019 | Ledvina et al. | |
| 10,662,697 B2* | 5/2020 | Frapsauce | G01S 15/931 |
| 10,696,275 B2 | 6/2020 | Spick et al. | |
| 10,982,481 B2* | 4/2021 | Elie | G01D 5/34 |
| 10,995,535 B2* | 5/2021 | Elie | B60J 5/047 |
| 11,365,579 B2* | 6/2022 | Ichinose | E05C 17/006 |
| 11,525,748 B2* | 12/2022 | Battenberg | B25J 13/088 |
| 11,866,983 B2* | 1/2024 | Schatz | G01S 13/34 |
| 2004/0196177 A1* | 10/2004 | Billington | G01S 13/583 |
| | | | 342/174 |
| 2005/0280284 A1* | 12/2005 | McLain | B60R 13/043 |
| | | | 296/146.1 |
| 2010/0228448 A1* | 9/2010 | Nakakura | E05F 15/43 |
| | | | 701/49 |
| 2010/0319256 A1* | 12/2010 | Agam | E05F 15/73 |
| | | | 49/31 |
| 2017/0028966 A1* | 2/2017 | Elie | B60K 28/12 |
| 2017/0030137 A1* | 2/2017 | Elie | B60J 5/047 |
| 2017/0030737 A1* | 2/2017 | Elie | E05F 15/78 |
| 2017/0321468 A1* | 11/2017 | Frapsauce | G01S 15/88 |
| 2018/0106882 A1* | 4/2018 | Kanaga | G01S 11/06 |
| 2018/0245390 A1* | 8/2018 | Elie | E05B 81/14 |
| 2019/0309564 A1 | 10/2019 | Mitchell et al. | |
| 2019/0383647 A1* | 12/2019 | Elie | B60J 5/047 |
| 2020/0132834 A1 | 4/2020 | Nakagaki et al. | |
| 2020/0141176 A1* | 5/2020 | Ichinose | E05F 15/73 |
| 2020/0355566 A1* | 11/2020 | Battenberg | B25J 13/088 |
| 2021/0061225 A1 | 3/2021 | Ahmed et al. | |
| 2021/0262274 A1* | 8/2021 | Schatz | G01S 13/34 |
| 2023/0324545 A1* | 10/2023 | Nagase | G01S 13/42 |

OTHER PUBLICATIONS

International Search Report and Written Opinion for International Application No. PCT/EP2022/067417, mailed Nov. 9, 2022, 13 pages (French).
French Search Report for French Application No. 2106853, dated Mar. 11, 2022 with translation, 11 pages.
English Translations of the Written Opinion of the International Searching Authority (Form PCT/ISA/237) issued Nov. 9, 2022, by the International Bureau of WIPO in corresponding International Application No. PCT/EP2022/067417. (5 pages).

* cited by examiner

METHOD FOR DETECTING THE OPENING OF THE OPENABLE SECTIONS OF A MOTOR VEHICLE AND ASSOCIATED DETECTION DEVICE

CROSS REFERENCE TO RELATED APPLICATIONS

This application is the U.S. National Phase Application of PCT International Application No. PCT/EP2022/067417, filed Jun. 24, 2022, which claims priority to French Patent Application No. 2106853, filed Jun. 25, 2021, the contents of such applications being incorporated by reference herein.

FIELD OF THE INVENTION

The invention relates to a method for detecting the opening of the openable sections of a motor vehicle and an associated activation device.

BACKGROUND OF THE INVENTION

At the present time, the opening of the openable sections (door or trunk) of a motor vehicle is detected by detection performed by a dedicated sensor, such as a contact detection sensor or a Hall effect sensor or other, in each openable section.

The incorporation of five dedicated sensors (4 doors and a trunk) represents a significant additional cost for the vehicle.

SUMMARY OF THE INVENTION

An aspect of the invention proposes a detection method and a detection device that are much less costly while being reliable and simple to implement.

An aspect of the invention relates to a method for detecting the opening of the openable sections of a motor vehicle by a detection device, the detection device comprising at least two ultra-high-frequency communication modules, each located on a different openable section and connected to an electronic computer, the detection device allowing "hands-free" access to the vehicle, the method being remarkable in that, the modules being capable of identifying one another, an opening angle of a first openable section is determined on the basis of:
  a) a first distance between a point of rotation of the first openable section on which a first communication module is located and a position of a second module when the two openable sections associated with said two modules are closed,
  b) a second distance between a point of rotation of the first openable section and a position of the first module on said openable section,
  c) a distance between the two modules when the two openable sections associated with the two modules are closed,
  d) a distance between said modules, said distance being determined by a time of flight of the ultra-high-frequency radiation exchanged between the two modules.

Preferably, the distance between the two modules when the two openable sections are closed, together with the first and the second distance, are determined in advance in a calibration phase.

An aspect of the invention also relates to a device for detecting the opening of the openable sections of a motor vehicle, comprising at least two ultra-high-frequency communication modules, each located on a different openable section of the vehicle and connected to an electronic computer, the detection device allowing "hands-free" access to the vehicle, the device being remarkable in that it further comprises:
  a) means for identifying the modules among each other,
  b) means for estimating a distance between a first module located on a first openable section and at least a second module located on a second openable section, on the basis of a time of flight of the ultra-wideband radiation exchanged between the two modules,
  c) means for determining the opening of the first openable section associated with the first module, on the basis of the distance thus estimated and the positions of the first module and the second module on the vehicle, when the first and second modules are closed.

Advantageously, the positions of the first and second module on the vehicle consist of:
  a) a first distance between a point of rotation of a first openable section on which a first communication module is located and a position of a second module when the first and second openable sections associated with said two modules are closed,
  b) a second distance between a point of rotation of the first openable section and a position of the first module on said openable section,
  c) a distance between the two modules when the two openable sections associated with the two modules are closed.

An aspect of the invention also applies to any motor vehicle comprising a detection device according to any one of the features set out above.

BRIEF DESCRIPTION OF THE DRAWINGS

Further features and advantages of an aspect of the invention will become more apparent upon reading the following description. This description is purely illustrative and should be read with reference to the appended drawings, in which.

DETAILED DESCRIPTION OF THE PREFERRED EMBODIMENTS

Figure 1:
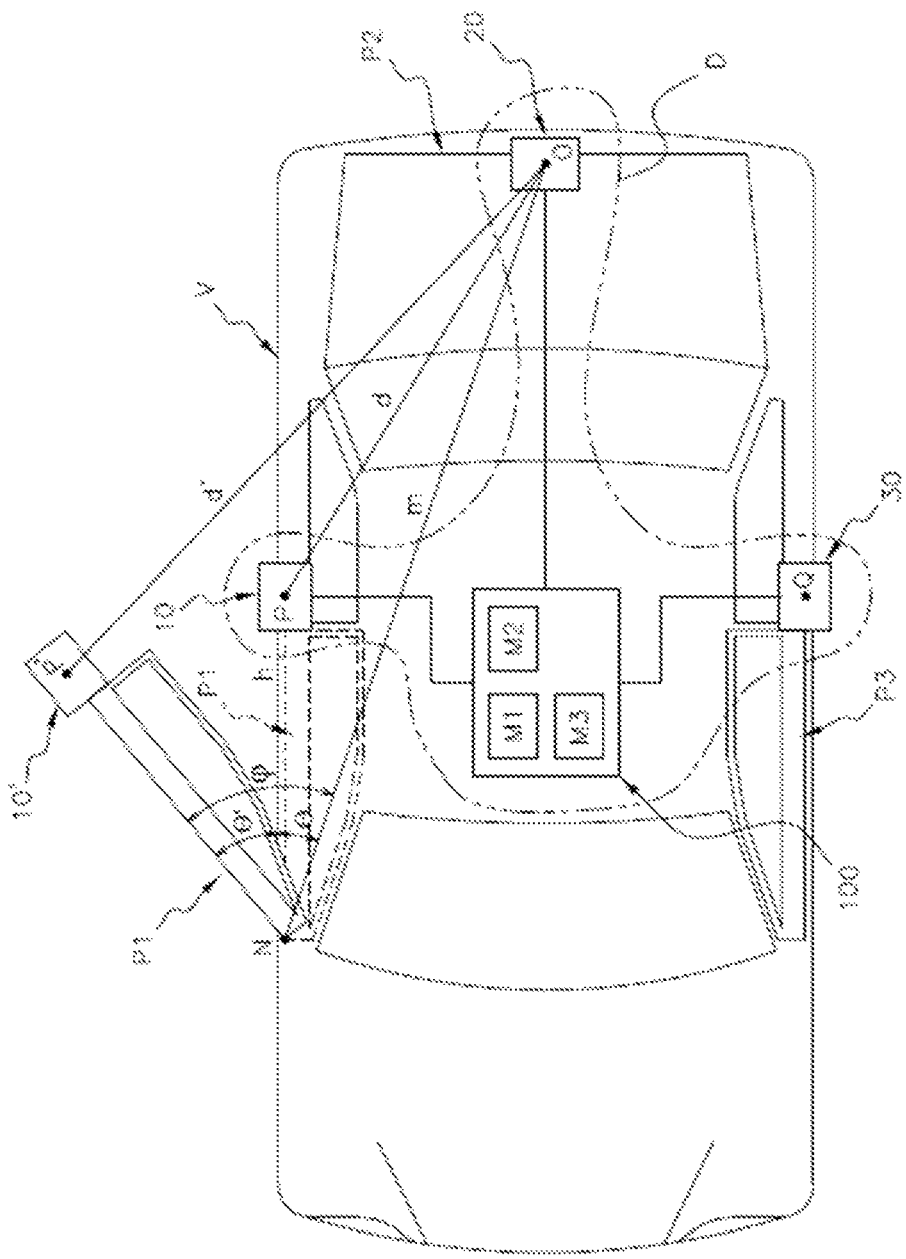
FIG. 1 schematically shows a motor vehicle comprising a detection device according to an aspect of the invention.

FIG. 1 shows a motor vehicle V equipped with a detection device according to an aspect of the invention.

The vehicle is equipped with a detection device D comprising at least two UWB (ultra-wideband) communication modules 10, 20; in the example shown in FIG. 1, three UWB modules 10, 20, 30 will be considered, these modules allowing "hands-free" access and/or starting of the vehicle V by the user. Two communication modules, namely a first module 10 and a third module 30, are located in the two front doors P1, P3 of the vehicle V, and a second communication module 20 is located at the hatch P2 of the trunk of the vehicle V. The detection device D also comprises an electronic computer 100 which communicates with the communication modules 10, 20, 30 in order to send and receive information with said modules.

A "hands-free" access system for accessing a motor vehicle V allows an authorized user to lock and/or unlock the openable sections P1, P2, P3 of his vehicle V without having to physically press buttons on a key. To this end, the vehicle identifies a portable device such as a fob or remote control of a key, or even a smartphone, carried by the user, and if the fob, the remote control, the key or the phone is located in a predetermined area around the vehicle V or in the vehicle V and is identified as belonging to the vehicle V, then the vehicle V automatically locks/unlocks its openable sections depending on the intention of the user, without the user having to physically manipulate a key.

For this purpose, when the user approaches the vehicle V, communication is established over a wireless communication link, for example a UWB (ultra-wideband) link, between the access device, for example an electronic fob or a mobile phone, and the communication module 10, 20, 30, in order to authenticate said access device by virtue of its identifier.

To this end, the communication module 10, 20, 30 comprises an antenna for receiving the identifier sent by the access device. Each communication module is connected to the electronic computer 100 of the vehicle (known as an ECU, for Electronic Control Unit), to which it transmits the identifier.

Depending on the location of the portable device identified by the vehicle V, in said location areas some actions specific to said location areas are automatically carried out, such as unlocking/locking or preliminary switching-on of the passenger compartment lighting (also called "welcome lighting").

Ultra-wideband (UWB) is a radio modulation technique that is based on the transmission of pulses with a very short duration, often of less than one nanosecond. Thus, the bandwidth can reach very high values.

The approach of the access device to the proximity of the communication module 10, 20, 30 (less than 10 cm away) and the recognition of the identifier received by the computer, combined with the detection of the presence of the user's hand, allows the door to be locked or unlocked.

In order to detect the presence of the user's hand and allow the openable sections P1, P2, P3 of the vehicle to be unlocked, it is known to use a capacitive sensor. Usually, one capacitive sensor is dedicated to one area.

For this purpose, the communication modules 10, 20, 30 are usually located in the openable sections P1, P2, P3 and operate only when the openable sections are closed, thus:
a) when the user approaches in order to unlock the openable section P1, P2, P3 that has previously been closed,
b) when the user moves away in order to lock the openable section P1, P2, P3 that has just been closed,
c) when the user is in the passenger compartment of the vehicle V and wishes to start his vehicle V, and the openable sections have previously been closed to ensure the user's safety when the vehicle V is started.

The operation of the communication modules 10, 20, 30 for "hands-free" access and/or starting is known to those skilled in the art and will not be detailed further here.

As shown in FIG. 1, each openable section, regardless of whether it is a front door P1 or P3, or the rear trunk P2, is equipped with a respective communication module 10, 30 or 20.

Each communication module 10, 20, 30 comprises, in a known way:
a) a UWB communication antenna,
b) a UWB transmitter/receiver circuit,
c) means for identifying a portable device of the user, these means alternatively being included in the electronic computer 100.

An aspect of the invention proposes that said communication modules also be capable of detecting the opening of openable sections of the vehicle, and therefore that said communication modules 10, 20, 30, by contrast with the prior art, also operate when the openable sections P1, P2, P3 are open.

In the remainder of the present description, by way of example, the angle of opening of the first openable section P1 on which the first module 10 is located will be determined by the second module 20 located on the second openable section P2, but an aspect of the invention is evidently applicable, mutatis mutandis, to the other openable sections P2, P3 located on the vehicle V.

For this purpose, according to an aspect of the invention, the detection device (D) also comprises:
a) means M1 for identifying the modules 10, 20, 30 among each other,
b) means M2 for estimating a distance between said module, called the first module 10, and at least a second module 20, on the basis of a time of flight t' of the ultra-wideband radiation exchanged between the two modules 10, 20,
c) means M3 for determining the opening of the first openable section P1 associated with the first module 10, on the basis of the distance thus estimated.

The identification means M1 comprise means for comparison between an identifier ID received by another communication module 10, 20, 30 and stored identifiers, in order to check that the received identifier corresponds to a module 10, 20, 30 on board the same vehicle V, and in order to associate this module with an openable section and a predetermined position on the vehicle V, as described below. Alternatively, the identification means M1 may be included in the electronic computer 100 which centralizes the information obtained from the communication modules 10, 20, 30.

The means M2 for estimating a distance between a first module 10 and at least a second on-board module 20 consist of means for estimating a time of flight t' of radiation exchanged between the first module 10 and the second module 20. On the basis of the time of flight t' of the radiation which travels out and back between the two modules 10, 20, it is possible to calculate a distance d' between the two modules, based on the following formula:

$$d' = \frac{t'}{2} \times c \qquad [\text{Math 1}]$$

where c is the speed of light, $3 \times 10^8$ m/s,
t' is the period between the instant of transmission of the radiation by the first communication module 10 and the instant of reception by said first module 10 of the radiation reflected by the second communication module 20, or vice versa.

The means M3 for determining the opening of the first openable section P1 comprise means for calculating an opening angle θ' of said first openable section P1 relative to its fixed pillar on the vehicle, on the basis of the distance d' thus calculated and the means for comparison with a predetermined initial angle θ, as described below.

This is illustrated in FIG. 1. The communication modules 10, 20, 30 are initially placed, respectively, at the points P, O and Q on the openable sections P1, P2, P3 of the vehicle V. The point N is defined as the point of rotation of the first openable section P1, that is to say the door P1 in this case, comprising the first module 10.

When the door P1 opens, the first module 10 moves from a first position P to a second position P', defining an opening angle θ' between the door and the fixed door pillar on the vehicle V.

When the first openable section P1 and the second openable section P2 are closed, the point of rotation N, together with the position P of the first module 10 and the position O of the second module 20 on the vehicle V, form a first general triangle. The apex angle N in this first triangle will be referred to as the initial angle θ.

When the first openable section P1 is opened and the second openable section P2 is closed, the point of rotation N, together with the new position P' of the first module 10' and the position O of the second module 10, form a second general triangle. Taking an angle θ' to be the opening angle of the first openable section P1, that is to say the door P1, relative to its fixed pillar on the vehicle, the apex angle N in this second triangle will be referred to as α, where α=θ+θ'.

Since the lengths of the sides of the first and second general triangles are known, we can calculate the initial angle θ and the opening angle θ', as described below.

In fact, a first distance m between the point of rotation N of the first openable section P1 and the position O of the second module 20, when the two openable sections P1, P2 associated with said two modules 10, 20 are closed, is known. This first distance m may be determined or measured during the design or manufacture of the vehicle V.

A second distance h between the point of rotation P of the first openable section P1 and the position P of said associated module 10 on said openable section P1 is also known. Similarly, this second distance h may be determined or measured during the design or manufacture of the vehicle V. Evidently, this second distance h does not vary according to whether the first openable section P1 is open or closed, because it corresponds to the position of the first module 10 on the first openable section P1 relative to the axis of rotation N of said first openable section P1.

Equally, when both openable sections P1, P2 are closed, the distance d between the first module 10 and the second module 20 is known, and said distance may be determined or measured during the design or manufacture of the vehicle V, or alternatively by measuring the time of flight of the radiation exchanged between the two modules, and recorded in each of the modules 10, 20 or in the central computer 100.

These distances being known, by applying the mathematical formulas for general triangles, we obtain:

$$\theta = arcos\left(\frac{h^2 + m^2 - d^2}{2 \times h \times m}\right) \quad \text{[Math 2]}$$

Thus the initial angle θ is determined by the first distance m, the second distance h, and the distance d between the two modules 10, 20 when the corresponding openable sections P1, P2 are closed.

As explained previously, when the first openable section P1 is open, the new distance d' between the two said modules 10, 20 is determined by using the time of flight t' of the UWB radiation exchanged between the two modules 10, 20 (see [Math 1]).

Similarly, by applying the mathematical formulas for general triangles, we obtain:

$$\alpha = arcos\left(\frac{h^2 + m^2 - d'^2}{2 \times h \times m}\right) \quad \text{[Math 3]}$$

and therefore:

$$\theta' = \alpha - \theta = arcos\left(\frac{h^2 + m^2 - d'^2}{2 \times h \times m}\right) - arcos\left(\frac{h^2 + m^2 - d^2}{2 \times h \times m}\right) \quad \text{[Math 4]}$$

Thus the means M3 for determining the opening of the first openable section P1 comprise means for calculating an opening angle θ' based on:
a) the distance d between the first and second module 20, when the corresponding openable sections, that is to say the first and second openable sections P1, P2, are closed,
b) the first distance m between the second module 20 and said point of rotation N of the first openable section P1 when the two openable sections P1, P2 are closed,
c) the second distance h between the first module 10 and the point of rotation N of the associated openable section, that is to say the first openable section P1 on which the first module 10 is located,
d) the distance d' between the two modules 10, 20 when the first openable section P1 has been opened and the second openable section P2 is closed, determined on the basis of the time of flight t' of the UWB radiation exchanged between the two modules 10, 20.

The identification means M1, the estimation means M2 and the determination means M3 are preferably in software form, and are integrated into each of the modules 10, 20, 30, or may alternatively be included in the electronic computer 100 which determines the opening angle θ' of the openable section on the basis of the information that it receives from the communication modules 10, 20, in this case the time of flight t' of the UWB radiation exchanged between the two modules 10, 20 and the identifiers ID1, ID2 of each module 10, 20. The other distances, namely the first distance m, the second distance h, and the distance d between the two modules when the openable sections P1, P2, P3 are closed are data determined in advance and stored either in each module 10, 20, 30 or in the electronic computer 100.

Figure 2:
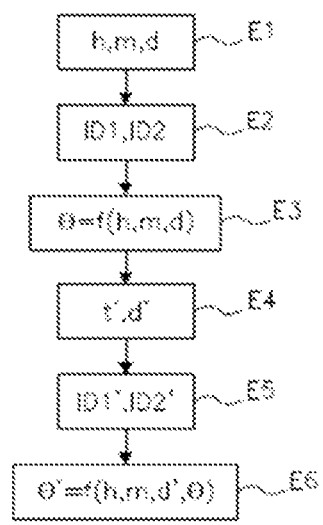
FIG. 2 is a flow chart showing the detection method according to an aspect of the invention.

The method illustrated in FIG. 2 will now be described.

In a first step E1, when the two openable sections P1, P2 are closed, the first distance m between the second module 20 and the point of rotation N of the first openable section P1 (the opening of which is to be determined) is known, as is the distance d between the two modules 10, 20. The second distance h between the point of rotation N and the location of the first module 10 on the door is also known, as explained previously.

In a second step E2, the modules communicate their identifiers ID1, ID2 to each other (step 1b) so that they know which openable section they are located on and can thus correctly associate the first distance m, between a module located on a closed openable section and the point of rotation of the openable section whose opening is to be determined, and the distance d between the two modules concerned, that is to say the module located on the openable section whose opening is to be determined and another module located on a closed openable section. Thus, in this example, the second module 20 and the first module 10 exchange their identifiers ID1, ID2.

Then, in a third step E3, the initial angle θ is determined on the basis of the distances m, h, d detailed above and according to the formula [Math 2].

This is followed, in a fourth step E4, by the calculation of the distance d' between the two modules 10 and 20 (see [Math 1]), using the time of flight t' of the radiation exchanged between the two modules 10 and 20.

Then, in a fifth step E5, the two modules 10, 20 exchange their identifiers ID1', ID2', in order to determine the first distance m, the second distance h, and the distance d between them when their respective openable sections P1, P2 are closed. Steps E4 and E5 may be executed simultaneously during the UWB communication between the two modules 10, 20.

On the basis of this distance d' thus calculated and the predetermined and recorded distances m, h, d, in the sixth step E6 it is possible to calculate the opening angle θ', which as explained above is the apex angle at the point of rotation N of the openable section P1, belonging to the triangle defined by the point of rotation N of the openable section P1, the position P' of the communication module 10 in the openable section P1, and the position O of another module 20, when the first openable section P1 is open and the second openable section P2 is closed.

$$\theta' = arcos\left(\frac{h^2 + m^2 - d'^2}{2 \times h \times m}\right) - \theta \qquad [\text{Math 5}]$$

where:
m is the distance between the point of rotation N of the first openable section P1 and the second module 20 when both openable sections are closed,
h is the distance between the point of rotation N and the first module 10,
d' is the distance between the two modules 10, 20, determined by the time of flight t', when the first openable section P1 is open and the second openable section P2 is closed,
θ is the initial apex angle at the point of rotation N of the openable section P1, belonging to the triangle defined by the point of rotation N of the openable section P1, the position P' of the communication module 10 in the openable section P1, and the position O of the second module 20 located on the same vehicle V, when the two corresponding openable sections P1, P2, or those associated with said two modules 10, 20, are closed.

Thus the opening angle θ' of the first openable section P1 on which the first module 10 is located may be determined by using:
a) the first distance m between the point of rotation N of the first openable section P1 and at least another module 20 on board the same vehicle V, when the two openable sections P1, P2 associated with said two modules 10, 20 are closed,
b) the distance d between the two modules 10, 20 when the two openable sections are closed,
c) the second distance h between the point of rotation N of the first openable section P1 and said first module 10, the first distance m and the second distance h possibly being determined in advance, for example during the installation of said two modules 10, 20 in the vehicle V,
d) the distance d' between said first module 10 and the second module 20, determined by the time of flight t' of the UWB radiation exchanged between the two modules 10, 20.

More precisely, the opening of the first openable section P1 may be determined by:
a) the positions of the two modules 10, 20 on the vehicle when the corresponding openable sections P1, P2 are closed, this enabling the first distance m, the second distance h and the distance d between the two modules to be determined,
b) the distance d' between the two modules, determined by the time of flight t' of the UWB radiation exchanged between said two modules 10, 20.

An aspect of the invention is therefore ingenious in that it enables the opening of an openable section to be determined using communication modules on board the vehicle V, which have the primary function of controlling the "hands-free" opening of the openable sections.

The invention is even more advantageous in that it is inexpensive and easy to implement.

The invention claimed is:

1. A method for detecting the opening of the openable sections of a motor vehicle by a detection device, the detection device comprising at least two ultra high frequency communication modules, each located on a different openable section and connected to an electronic computer, the detection device allowing "hands-free" access to the vehicle, the method being characterized in that, said modules being capable of identifying one another, an opening angle of a first openable section is determined on the basis of:
a) a first distance between a point of rotation of the first openable section on which a first communication module is located and a position of a second module (20) when the two openable sections associated with said two modules are closed,
b) a second distance between a point of rotation of the first openable section and a position of the first module on said openable section,
c) a distance between said modules when the two openable sections associated with the two modules are closed, and
d) a distance between said modules, said distance being determined by a time of flight of the ultra-high-frequency radiation exchanged between the two modules.

2. The detection method as claimed in claim 1, wherein the distance between the two modules when the two openable sections are closed, as well as the first and second distance, are determined in advance in a calibration phase.

3. A device for detecting the opening of the openable sections of a motor vehicle, comprising at least two ultra-high-frequency communication modules, each located on a different openable section of the vehicle and connected to an electronic computer, the detection device allowing "hands-free" access to the vehicle, the device further comprising:
a) means for identifying the modules among each other,
b) means for estimating a distance between a first module located on a first openable section and at least a second module located on a second openable section, on the basis of a time of flight of the ultra-wideband radiation exchanged between the two modules, and
c) means for determining the opening of the first openable section associated with the first module, on the basis of the distance thus estimated and the positions of the first module and the second module on the vehicle, when the first and second openable sections are closed.

4. The detection device as claimed in claim 3, wherein the positions of the first and second module on the vehicle consist of:

a) a first distance between a point of rotation of a first openable section on which a first communication module is located and a position of a second module when the first and second openable sections associated with said two modules are closed,
b) a second distance between a point of rotation of the first openable section and a position of the first module on said openable section,
c) a distance between the two modules when the two openable sections associated with the two modules are closed.

5. A motor vehicle comprising a detection device as claimed in claim 3.

* * * * *